July 3, 1928.
H. T. HERR
1,675,490
ADJUSTABLE BEARING
Filed Nov. 7, 1921
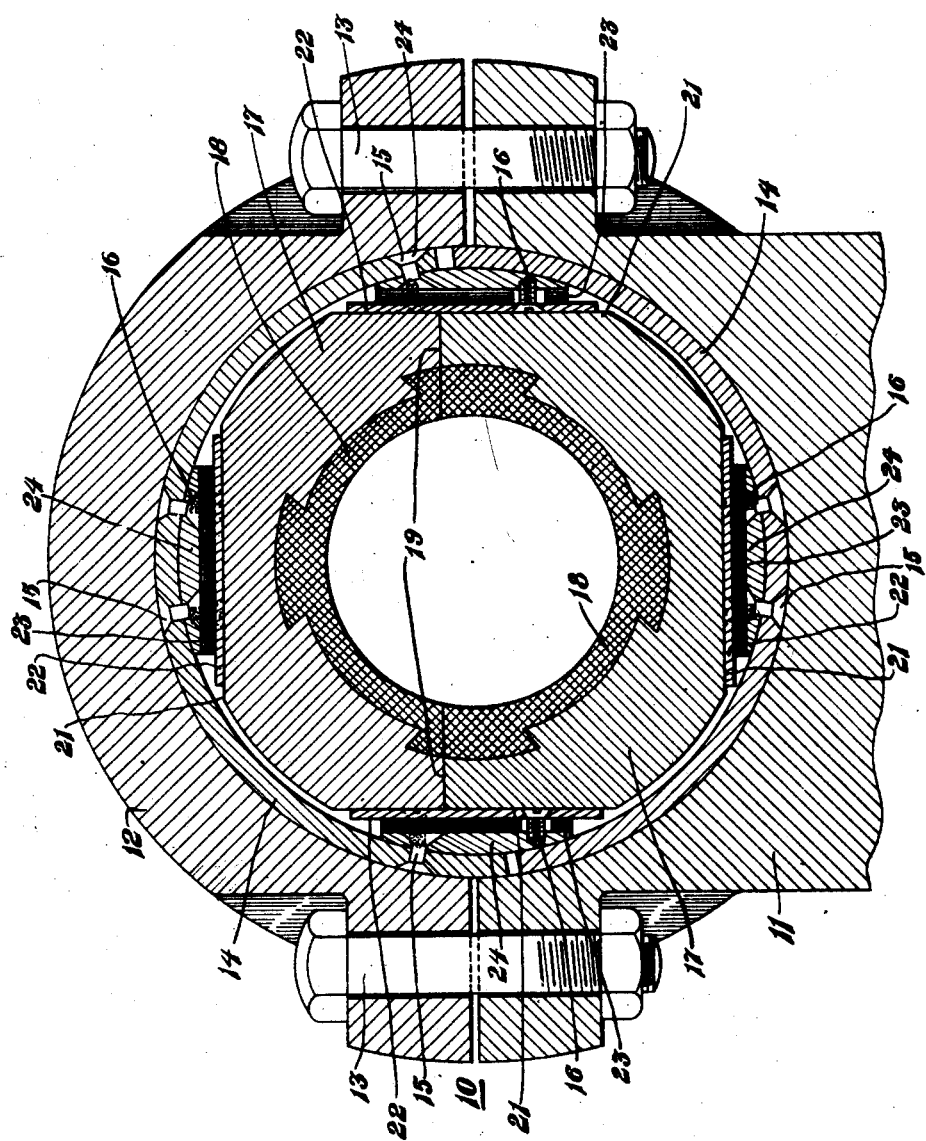
H.T.Herr
INVENTOR
BY D.C.Davis
ATTORNEY Patented July 3, 1928.

1,675,490

UNITED STATES PATENT OFFICE.

HERBERT T. HERR, OF MERION, PENNSYLVANIA, ASSIGNOR TO WESTINGHOUSE ELECTRIC AND MANUFACTURING COMPANY, A CORPORATION OF PENNSYLVANIA.

ADJUSTABLE BEARING.

Application filed November 7, 1921. Serial No. 513,467.

My invention relates to bearings and more particularly to adjustable shaft bearings of the pillow-block type, and it has for an object to provide a method of and an apparatus for adjusting the bearing block of a bearing of the character designated relatively to the housing thereof, which shall serve to prevent jamming of the block in the housing during adjustment.

This and other objects, which will be more apparent throughout the further description of my invention, are attained by means of the device described herein and illustrated in the accompanying drawing in which the single figure is a transverse section through a bearing constructed in accordance with the invention.

Adjustable shaft bearings hitherto proposed, so far as I am aware, have been open to the objection that unguided movements of adjustment of the bearing block relatively to the bearing housing have tended to give to the block a slight rotatory motion, causing it to jam in the housing, thus forcing the block axis, and consequently the shaft, into a position other than that which the adjustment was desired to effect. It is the purpose of the present invention to provide a bearing in which adjustment movements are so guided as to prevent such jamming action.

Turning to the drawing for a more detailed understanding of my invention, I have indicated at 10 a frame or housing for a shaft bearing of the pillow-block type, consisting of a body portion 11 and a cap portion 12, secured together by bolts 13 in the usual manner. Associated with and carried by the housing 10 is a split ring 14, which is drilled and counter-sunk at four opposite points to receive rivets 15, by means of which opposed segmental shoes 24 are secured thereto.

Within the housing 10 is mounted a bearing block 17, generally circular in form, which carries on its interior the usual antifriction metal lining 18, the inner surface of which lining constitutes the bearing proper. The bearing block 17 and the lining 18 are both split as indicated at 19 to facilitate dismantling of the bearing.

The exterior surface of the bearing block 17 is provided with plane guide faces 21, arranged in diametrically opposite pairs and located on diameters which intersect at right angles at the center of the block; the planes defined by each pair of the guide faces 21 being parallel. Slidably mounted on each of the guide faces 21 is a thin plate 22 which carries on its back a nest of shims 23 of any well known construction. Each of the shim nests 23 is mounted on one of the segmental shoes 24, of which the flat surface cooperates with the shim nest 23, and the curved surface with the split ring 14. The shim nests 23 are secured to the segmental shoes 24 by means of screws 16, which pass through the plates 22 and are tapped into the segmental shoes. It is evident that each of the assemblies which consists of a shoe 24, a shim nest 23, and a plate 22, transmits a radial pressure from the ring 14 to the bearing block 17, and these radial pressures are arranged in equal opposed pairs acting at right angles to each other so that the bearing block 17 is adjustably secured in the housing 10.

The operation of my device is as follows. Assuming that it is desired to shift the axis of the housing to the right and upwards, as the drawing is viewed, to correct an error in shaft alinement or for any other reason, shims are removed from the nest at the right and inserted in the nest at the left, the bearing block sliding to the right on the upper and lower parallel guide faces, between the upper and lower plates, until the axis of the block 17 is directly under the desired position. Shims are then removed from the upper nest and inserted in the lower nest, the bearing block 17 sliding on its vertically disposed parallel guide faces between the vertically disposed plates, until the axis has been raised to the desired position. In each of the movements of adjustment just described, the path of any point on the axis of the bearing block 17 is restricted to a straight line, the total path of such a point through an adjustment such as described being two straight lines at right angles and lying in a plane normal to the axis of the shaft housing 10, the whole movement of the bearing block 17 being rectilinear. Since no rotatory motion of the block 17 is permitted during the adjustment, no jamming of the block 17 against the housing can occur.

While I have shown my invention in but one form it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a shaft bearing in which a bearing block is mounted in a housing, in combination, means comprising opposed shim nests for adjusting the block axis relatively to the frame axis including opposed parallel guide faces on the outer surface of the block, and plates adapted to slide on the guide faces and to transmit radial pressure from the shim nests to said guide faces whereby the angular relation between the said axes is maintained during the adjustment.

2. In a shaft bearing in which a bearing block is mounted in a housing, in combination, means for adjusting the block axis relatively to the housing axis comprising opposed shim nests, a split ring surrounding said shim nests and carried by the housing, shoes cooperating with the ring and supporting the shim nests, and means whereby the angular relation between the said axes is maintained during the adjustment, comprising opposed parallel guide faces and plates adapted to slide on the guide faces and to transmit radial pressure from the shim nests to said guide faces.

3. In a shaft bearing in which a bearing block is mounted in a housing, in combination, means comprising opposed shim nests for adjusting the block axis relatively to the housing axis including opposed parallel guide faces on the outer surface of the block and plates adapted to slide on the guide faces and to transmit radial pressure from the shim nests to said guide faces, a split ring surrounding said shim nests and carried by the housing and shoes cooperating with the ring and supporting the shim nests whereby the points on the block axis are restricted to rectilinear movement in planes normal to the housing axis.

4. In a bearing, the combination of a bearing housing, means providing two pairs of substantially flat guide surfaces within the housing, the guide surfaces of each pair being arranged in opposed parallel relation to one another and at diametrically opposite sides of the bearing housing, the guide surfaces of one pair being arranged at right angles to the guide surfaces of the other pair, a plurality of independent means arranged entirely within the housing and providing adjustable movement of each of the guide surfaces toward and away from the bearing housing, and a bearing block disposed within the housing and being provided on its outer sides with two pairs of substantially flat guide faces, the guide faces of each pair being arranged in parallel relation to one another and on diametrically opposite sides of the bearing block, each guide face of the block being in opposed parallel relation with and engaging one of the guide surfaces provided within the housing.

5. In a bearing, the combination of a bearing housing, means providing two pairs of substantially flat guide surfaces within the housing, the guide surfaces of each pair being arranged in opposed parallel relation to one another and at diametrically opposite sides of the bearing housing, the guide surfaces of one pair being arranged at right angles to the guide surfaces of the other pair, a plurality of independent groups of removable spacing members, one of the groups being interposed between each of the guide surfaces and the bearing housing and providing adjustable movement of said surface toward and away from the housing, and a bearing block disposed within the housing and being provided on its outer sides with two pairs of substantially flat guide faces, the guide faces of each pair being arranged in parallel relation to one another and on opposite sides of the block, each guide face on the block being in opposed parallel relation with and engaging one of the guide surfaces provided within the housing.

6. In a bearing, the combination of a bearing housing, two pairs of plate-like guide members arranged within the housing, each of said plate-like guide members having a substantially flat guide surface, the guide members of each pair being arranged at diametrically opposite sides of the housing with their guide surfaces disposed in opposed parallel relation to one another, the guide surfaces of one pair being arranged at right angles to the guide surfaces of the other pair, a plurality of independent means arranged entirely within the housing and providing adjustable movements of each of the guide surfaces toward and away from said housing, and a bearing block disposed within the housing and being provided on its outer side with two pairs of substantially flat guide faces, the guide faces of each pair being arranged in parallel relation to one another and on diametrically opposite sides of the bearing block, each guide face of the block being in opposed parallel relation with and engaging one of the guide surfaces provided within the housing.

7. In a bearing, the combination of a bearing housing, two pairs of plate-like guide members arranged within the housing, each of said plate-like guide members having a substantially flat guide surface, the guide members of each pair being arranged at diametrically opposite sides of the housing with their guide surfaces disposed in opposed parallel relation to one another, the guide surfaces of one pair being arranged at right angles to the guide surfaces of the other pair, a plurality of independent groups of removable spacing members, one of the groups being disposed interposed each of the guide surfaces and the bearing housing and providing adjustable movement of said surface toward and away from the housing, and a bearing block disposed within the housing and being provided on its outer side with two pairs of substantially flat guide faces, the guide faces of each pair being arranged in parallel relation to one another and on diametrically opposite sides of the bearing block, each guide face of the block being in opposed parallel relation with and engaging one of the guide surfaces provided within the housing.

In testimony whereof, I have hereunto subscribed my name this 31st day of October, 1921.

HERBERT T. HERR.